(12) United States Patent
Yasuda

(10) Patent No.: US 12,091,550 B2
(45) Date of Patent: Sep. 17, 2024

(54) PNEUMATIC TIRE

(71) Applicant: SUMITOMO RUBBER INDUSTRIES, LTD., Hyogo (JP)

(72) Inventor: Rie Yasuda, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 823 days.

(21) Appl. No.: 17/265,000

(22) PCT Filed: Aug. 2, 2019

(86) PCT No.: PCT/JP2019/030539
§ 371 (c)(1),
(2) Date: Feb. 1, 2021

(87) PCT Pub. No.: WO2020/031904
PCT Pub. Date: Feb. 13, 2020

(65) Prior Publication Data
US 2021/0324184 A1  Oct. 21, 2021

(30) Foreign Application Priority Data
Aug. 6, 2018 (JP) ................................ 2018-147629

(51) Int. Cl.
*C08L 9/06* (2006.01)
*B60C 1/00* (2006.01)
*C08L 15/00* (2006.01)

(52) U.S. Cl.
CPC ...... *C08L 9/06* (2013.01); *B60C 1/00* (2013.01); *C08L 15/00* (2013.01); *C08L 2207/324* (2013.01)

(58) Field of Classification Search
CPC ...... C08L 9/06; C08L 15/00; C08L 2207/324; B60C 1/00
See application file for complete search history.

(56) References Cited

U.S. PATENT DOCUMENTS

| | | |
|---|---|---|
| 5,177,171 A | 1/1993 | Usubuchi et al. |
| 2006/0167160 A1 | 7/2006 | Nakagawa et al. |
| 2006/0173134 A1 | 8/2006 | Endo |
| 2017/0226233 A1 | 8/2017 | Yamashiro et al. |
| 2017/0240724 A1 | 8/2017 | Yamashiro et al. |
| 2018/0142089 A1 | 5/2018 | Yamashiro |
| 2019/0264011 A1 | 8/2019 | Tochika |
| 2019/0264013 A1* | 8/2019 | Hishikawa ............ C08L 21/00 |
| 2020/0055963 A1 | 2/2020 | Takahashi |

FOREIGN PATENT DOCUMENTS

| | | |
|---|---|---|
| CN | 106574079 | 4/2017 |
| CN | 107090110 | 8/2017 |
| CN | 108084532 | 5/2018 |
| EP | 1514901 | 3/2005 |
| EP | 1652878 | 5/2006 |
| EP | 2995472 | 3/2016 |
| JP | H02-147647 | 6/1990 |
| JP | H03-206456 A | 9/1991 |
| JP | 10-168235 | 6/1998 |
| JP | 2003-253051 | 9/2003 |
| JP | 2003253051 A * | 9/2003 |
| JP | 2006-257254 | 9/2006 |
| JP | 2008-196386 A | 8/2008 |
| JP | 2008184517 A * | 8/2008 |
| JP | 2009-191223 A | 8/2009 |
| JP | 2011-132481 A | 7/2011 |
| JP | 2012224835 A * | 11/2012 |
| JP | 2014-189697 | 10/2014 |
| JP | 2016-056351 | 4/2016 |
| JP | 2018-095681 A | 6/2018 |
| JP | 2018-177920 | 11/2018 |
| WO | 2018/110409 A1 | 6/2018 |
| WO | WO-2018110409 A1 * | 6/2018 ............... B60C 1/00 |

OTHER PUBLICATIONS

ISR issued in WIPO Patent Application No. PCT/JP2019/030539, dated Nov. 5, 2019, English translation.
IPRP issued in WIPO Patent Application No. PCT/JP2019/030539, dated Feb. 9, 2021, English translation.

* cited by examiner

*Primary Examiner* — Kumar R Bhushan
(74) *Attorney, Agent, or Firm* — GREENBLUM & BERNSTEIN, P.L.C.

(57) ABSTRACT

The present invention provides pneumatic tires which have reduced changes in hardness over time and which provide improved abrasion resistance while ensuring good durability. The present invention relates to a pneumatic tire formed from a rubber composition, the rubber composition containing: a rubber component including a hydrogenated copolymer containing a structural unit derived from an aromatic vinyl compound and a structural unit derived from a conjugated diene compound; and a liquid polymer having a number average molecular weight of 2,500 to 500,000, the hydrogenated copolymer being present in an amount of 80% by mass or less based on 100% by mass of the rubber component, the liquid polymer being present in an amount of 1 to 50 parts by mass per 100 parts by mass of the rubber component.

7 Claims, No Drawings

PNEUMATIC TIRE

TECHNICAL FIELD

The present invention relates to pneumatic tires including a specific rubber composition.

BACKGROUND ART

Exemplary rubber compositions that have been used in automobile tires contain diene rubbers such as polybutadiene or butadiene-styrene copolymers and plasticizers such as oils.

Moreover, Patent Literature 1 proposes techniques of using hydrogenated diene polymers to improve properties such as abrasion resistance.

CITATION LIST

Patent Literature

Patent Literature 1: JP H02-147647 A

SUMMARY OF INVENTION

Technical Problem

Conventional diene rubbers, which have a lot of double bonds, will undergo changes in hardness (hardening) with time due to re-crosslinking. Moreover, conventional plasticizers have a small molecular weight and can easily migrate out of the rubber composition, thereby accelerating hardening of the rubber. The hardening of the rubber will result in changes in properties such as ride quality. Thus, it is impossible to provide stable tire performance to the user.

Although various techniques have been developed to improve abrasion resistance of tires, the effects of these techniques are insufficient.

The present invention aims to solve the problem and provide pneumatic tires which have reduced changes in hardness over time and which provide improved abrasion resistance while ensuring good durability.

Solution to Problem

The present invention relates to a pneumatic tire, formed from a rubber composition, the rubber composition containing: a rubber component including a hydrogenated copolymer containing a structural unit derived from an aromatic vinyl compound and a structural unit derived from a conjugated diene compound; and a liquid polymer having a number average molecular weight of 2,500 to 500,000, the hydrogenated copolymer being present in an amount of 80% by mass or less based on 100% by mass of the rubber component, the liquid polymer being present in an amount of 1 to 50 parts by mass per 100 parts by mass of the rubber component.

The hydrogenated copolymer preferably has a weight average molecular weight of 200,000 to 2,000,000 and a degree of hydrogenation of 75 mol % or more.

The hydrogenated copolymer is preferably present in an amount of 20 to 60% by mass based on 100% by mass of the rubber component.

The hydrogenated copolymer is preferably a hydrogenated styrene-butadiene copolymer.

The hydrogenated copolymer is preferably a hydrogenated modified styrene-butadiene copolymer.

The liquid polymer is preferably a modified liquid polymer.

The liquid polymer is preferably a (co)polymer of at least one selected from the group consisting of butadiene, isoprene, styrene, farnesene, and derivatives thereof.

The rubber composition preferably further contains a resin having a softening point of 60 to 120° C.

Advantageous Effects of Invention

The pneumatic tires of the present invention are formed from a rubber composition containing predetermined amounts of a specific hydrogenated copolymer and a specific liquid polymer. Such pneumatic tires have reduced changes in hardness over time and further provide improved abrasion resistance while ensuring good durability.

DESCRIPTION OF EMBODIMENTS

The pneumatic tires of the present invention are formed from a rubber composition which contains a rubber component including a hydrogenated copolymer containing a structural unit derived from an aromatic vinyl compound and a structural unit derived from a conjugated diene compound; and a liquid polymer having a number average molecular weight of 2,500 to 500,000. The hydrogenated copolymer is present in an amount of 80% by mass or less based on 100% by mass of the rubber component. The liquid polymer is present in an amount of 1 to 50 parts by mass per 100 parts by mass of the rubber component. Such pneumatic tires have reduced changes in hardness over time and further provide improved abrasion resistance while ensuring good durability.

The hydrogenated copolymer has a few double bonds and is less likely to undergo re-crosslinking. Moreover, the liquid polymer has a larger molecular weight than typical plasticizers such as oils and is less likely to migrate out of the rubber composition. Thus, it is believed that by using them in combination, the changes in hardness (hardening) over time can be reduced.

The hydrogenated copolymer also has an effect of improving abrasion resistance. However, since the hydrogenated copolymer is less likely to crosslink with other rubber components, it usually tends to lead to lower peeling resistance. In contrast, according to the present invention, the amount of the hydrogenated copolymer is adjusted to not more than a predetermined value to improve peeling resistance. Thus, it is believed that good durability can be ensured while enjoying the effect of improving abrasion resistance.

Examples of the aromatic vinyl compound used in the hydrogenated copolymer include styrene, α-methylstyrene, 1-vinylnaphthalene, 3-vinyltoluene, ethylvinylbenzene, divinylbenzene, 4-cyclohexylstyrene, and 2,4,6-trimethylstyrene. These may be used alone or in combinations of two or more, but styrene is particularly preferred in view of practical aspects such as availability of monomers and because the advantageous effects of the present invention can be more suitably achieved.

Examples of the conjugated diene compound used in the hydrogenated copolymer include 1,3-butadiene, isoprene, 1,3-pentadiene, 2,3-dimethylbutadiene, 2-phenyl-1,3-butadiene, and 1,3-hexadiene. These may be used alone or in combinations of two or more, but 1,3-butadiene or isoprene is preferred, with 1,3-butadiene being more preferred, in view of practical aspects such as availability of monomers and because the advantageous effects of the present invention can be more suitably achieved.

The copolymer of the aromatic vinyl compound and the conjugated diene compound is preferably a copolymer of styrene and 1,3-butadiene (styrene-butadiene copolymer (SBR)). Therefore, the hydrogenated copolymer is preferably a hydrogenated styrene-butadiene copolymer (hydrogenated SBR). Moreover, the hydrogenated styrene-butadiene copolymer is preferably a hydrogenated modified styrene-butadiene copolymer (hydrogenated modified SBR) which has been modified by the method described later.

The styrene-butadiene copolymer may be produced by copolymerizing styrene and 1,3-butadiene in any order. The copolymerization may be random copolymerization or block copolymerization, preferably random copolymerization. The same applies to aromatic vinyl compound/conjugated diene compound copolymers other than the styrene-butadiene copolymer.

From the standpoints of abrasion resistance and of reducing changes in hardness, the degree of hydrogenation of the hydrogenated copolymer (the degree of hydrogenation of the conjugated diene portion of the copolymer of the aromatic vinyl compound and the conjugated diene compound) is preferably 75 mol % or more, more preferably 80 mol % or more, still more preferably 85 mol % or more. From the standpoint of durability, the degree of hydrogenation is preferably 99 mol % or less, more preferably 96% mol % or less, still more preferably 90 mol % or less.

The degree of hydrogenation may be calculated from the rate of decrease in the unsaturated bond signals in the $^1$H-NMR spectrum.

The hydrogenated copolymer preferably has a weight average molecular weight (Mw) of 200,000 or more, more preferably 300,000 or more, still more preferably 350,000 or more, particularly preferably 400,000 or more, but preferably 2,000,000 or less, more preferably 1,000,000 or less, still more preferably 700,000 or less, particularly preferably 450,000 or less. When the Mw is within the range indicated above, the advantageous effects of the present invention can be suitably achieved.

Herein, the weight average molecular weight (Mw) and number average molecular weight (Mn) may be determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

The hydrogenated copolymer preferably has a glass transition temperature (Tg) of −45° C. or higher, more preferably −35° C. or higher, still more preferably −30° C. or higher, but preferably −10° C. or lower, more preferably −15° C. or lower, still more preferably −20° C. or lower. When the Tg is within the range indicated above, the advantageous effects of the present invention can be suitably achieved.

The glass transition temperature (Tg) of the hydrogenated copolymer is measured as described later in EXAMPLES.

In the case where the hydrogenated copolymer is a hydrogenated SBR, the hydrogenated SBR preferably has a styrene content of 5% by mass or higher, more preferably 20% by mass or higher, still more preferably 25% by mass or higher, particularly preferably 30% by mass or higher, but preferably 50% by mass or lower, more preferably 40% by mass or lower.

When the styrene content is within the range indicated above, the advantageous effects of the present invention can be suitably achieved.

The styrene content is determined as described later in EXAMPLES.

The hydrogenated copolymer, before hydrogenation, preferably has a vinyl content of 15% by mass or more, more preferably 25% by mass or more, but preferably 80% by mass or less, more preferably 65% by mass or less, still more preferably 50% by mass or less, particularly preferably 40% by mass or less. When the vinyl content is within the range indicated above, the advantageous effects of the present invention can be suitably achieved.

The vinyl content is determined as described later in EXAMPLES.

The hydrogenated copolymer may be synthesized, for example, by polymerizing an aromatic vinyl compound and a conjugated diene compound to produce a copolymer and hydrogenating the copolymer. Specifically, it may be synthesized as described below.

<Method for Producing Copolymer>
(Polymerization Method)

The copolymer of the aromatic vinyl compound and the conjugated diene compound may be produced by any polymerization method, including solution polymerization, vapor phase polymerization, and bulk polymerization, particularly preferably by solution polymerization. Moreover, the polymerization may be carried out either in a batch mode or in a continuous mode.

For solution polymerization, the monomer concentration (the combined amount of styrene and 1,3-butadine in the case of a styrene-butadiene copolymer) in the solvent is preferably 5% by mass or more, more preferably 10% by mass or more. If the monomer concentration in the solution is less than 5% by mass, the copolymer yield tends to be small, resulting in a higher cost. The monomer concentration in the solvent is also preferably 50% by mass or less, more preferably 30% by mass or less. If the monomer concentration in the solvent is more than 50% by mass, the solution tends to become too viscous to stir easily, and thus the polymerization tends not to readily proceed.

(Polymerization Initiator for Anionic Polymerization)

For anionic polymerization, any polymerization initiator may be used, but organic lithium compounds are preferred. Examples of the organic lithium compounds include those containing C2-C20 alkyl groups, such as ethyllithium, n-propyllithium, isopropyllithium, n-butyllithium, sec-butyllithium, tert-butyllithium, tert-octyllithium, n-decyllithium, phenyllithium, 2-naphthyllithium, 2-butylphenyllithium, 4-phenylbutyllithium, cyclohexyllithium, cyclopentyllithium, and reaction products of diisopropenylbenzene and butyllithium. From the standpoints of availability, safety, and other aspects, n-butyllithium or sec-butyllithium is preferred among these.

Moreover, the polymerization reaction may be carried out in the presence of a compound (R) prepared by mixing at least one of the organic lithium compounds mentioned above with a compound (B1) containing a functional group interactive with silica. By performing the polymerization in the presence of the compound (R), the functional group interactive with silica can be introduced to the polymerization initiating terminal of the copolymer. The copolymer thus obtained has a modified initiation terminal. The term "interactive" herein means that a covalent bond or an intermolecular force weaker than the covalent bond (e.g., an electromagnetic force between molecules such as an ion-dipole interaction, dipole-dipole interaction, hydrogen bond, or van der Waals force) can be formed between molecules. The term "functional group interactive with silica" refers to a group having at least one atom interactive with silica, such as nitrogen, sulfur, phosphorus, or oxygen atom.

In particular, the compound (R) is preferably a reaction product of an organic lithium compound and a nitrogen-containing compound such as a secondary amine compound. Specific examples of the nitrogen-containing compound include dimethylamine, diethylamine, dipropylamine, dibutylamine, dodecamethyleneimine, N,N'-dimethyl-N'-trimethylsilyl-1,6-diaminohexane, piperidine, pyrrolidine, hexamethyleneimine, heptamethyleneimine, dicyclohexylamine, N-methylbenzylamine, di-(2-ethylhexyl)amine, diallylamine, morpholine, N-(trimethylsilyl)piperazine, N-(tert-butyldimethylsilyl)piperazine, and 1,3-ditrimethylsilyl-1,3,5-triazinane. The polymerization in the presence of the compound (R) may be carried out by preliminarily mixing an organic lithium compound with a compound (B1) to prepare a compound (R) and adding the compound (R) to the polymerization system. Alternatively, the polymerization may be carried out by adding an organic lithium compound and a compound (B1) to the polymerization system and mixing them in the polymerization system to prepare a compound (R).

(Method for Anionic Polymerization)

The production of the copolymer through anionic polymerization using the polymerization initiator may be carried out by any conventional method.

Specifically, monomers such as styrene and 1,3-butadiene may be anionically polymerized in an organic solvent inert to the reaction, for example, a hydrocarbon solvent such as an aliphatic, alicyclic, or aromatic hydrocarbon compound using a polymerization initiator such as butyllithium, optionally in the presence of a randomizer to produce a target copolymer such as a styrene-butadiene copolymer.

(Hydrocarbon Solvent for Anionic Polymerization)

The hydrocarbon solvent is preferably a C3-C8 hydrocarbon solvent, and examples include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, and ethylbenzene. These may be used alone or in admixtures of two or more.

(Randomizer for Anionic Polymerization)

The randomizer refers to a compound that has the function of controlling the microstructure of the conjugated diene portion of a copolymer, for example, increase of 1,2-butadiene units or 3,4-isoprene units, or the function of controlling the compositional distribution of monomer units in a copolymer, for example, randomization of styrene and butadiene units in a styrene-butadiene copolymer. The randomizer is not limited, and any known compound commonly and conventionally used as a randomizer may be used. Examples include ethers and tertiary amines, such as dimethoxybenzene, tetrahydrofuran, dimethoxyethane, diethylene glycol dibutyl ether, diethylene glycol dimethyl ether, bistetrahydrofurylpropane, triethylamine, pyridine, N-methylmorpholine, N,N,N',N'-tetramethylethylenediamine, and 1,2-dipiperidinoethane. Other examples include potassium salts such as potassium-t-amylate and potassium-t-butoxide, and sodium salts such as sodium-t-amylate. These randomizers may be used alone or in combinations of two or more. The amount of the randomizer used per mol of the organic lithium compound is preferably 0.01 mole equivalents or more, more preferably 0.05 mole equivalents or more. If the amount of the randomizer is less than 0.01 mole equivalents, the added randomizer tends to produce a small effect, and thus randomization tends not to occur readily. The amount of the randomizer per mol of the organic lithium compound is preferably 1000 mole equivalents or less, more preferably 500 mole equivalents or less. If the amount of the randomizer is more than 1000 mole equivalents, the reaction rate of monomers tends to change greatly, and the randomization tends to be adversely affected.

The Tg of the copolymer may be controlled by varying the type and amount of the randomizer used. For example, the Tg of the copolymer may be lowered by reducing the amount of tetrahydrofuran.

(Reaction Temperature)

The anionic polymerization may be carried out at any reaction temperature at which the reaction suitably proceeds. Usually, the reaction temperature is preferably −10° C. to 100° C., more preferably 25° C. to 70° C.

(Modification Step)

The active terminal of the copolymer obtained by the above polymerization step may be reacted with a compound (B2) containing a functional group interactive with silica to introduce the functional group interactive with silica to the polymerization terminating terminal of the copolymer. This step allows the copolymer to have a modified polymerization terminating terminal. The term "terminal" herein refers to a molecular chain end portion other than monomer-derived structures containing carbon-carbon double bonds.

The copolymer used in the modification reaction (hereinafter, also referred to as terminal modification reaction) may be any copolymer that has an active terminal with an unmodified or modified polymerization initiating terminal. The compound (B2) may be any compound that contains a functional group interactive with silica and is reactable with the polymerization active terminal. Preferred specific examples of the compound (B2) include:

(I) a compound (B2-1) represented by the following formula (1):

wherein $A^1$ represents a monovalent functional group which contains no active hydrogen but contains at least one selected from the group consisting of a nitrogen atom, a phosphorus atom, and a sulfur atom, and which is bound to $R^5$ through the nitrogen, phosphorus, or sulfur atom; $R^3$ and $R^4$ each represent a hydrocarbyl group; $R^5$ represents a hydrocarbylene group; and n represents an integer of 0 to 2, provided that when a plurality of $R^3$ or $R^4$ groups are present, they may be the same or different;

(II) a compound (B2-2) which has, in the molecule, one or more functional groups (x1) of at least one type selected from the group consisting of a cyclic ether group, a (thio)carbonyl group, and an iso(thio)cyanate group, and one or more groups (x2) which are different from the functional groups (x1) and which contain no active hydrogen but contain at least one selected from the group consisting of a nitrogen atom, a phosphorus atom, an oxygen atom, and a sulfur atom, provided that at least one of the nitrogen, phosphorus, and sulfur atoms may be protected by a trisubstituted hydrocarbylsilyl group; and (III) a compound (B2-3) having two or more iso(thio)cyanate groups in the molecule. These compounds (B2) may be used alone or in combinations of two or more. Herein, the term "(thio)carbonyl group" refers to a carbonyl group and a thiocarbonyl group; and the term "iso(thio)cyanate group" refers to an isocyanate group and an isothiocyanate group.

The hydrocarbyl group as $R^3$ and $R^4$ in formula (1) is preferably a linear or branched C1-C20 alkyl group, a C3-C20 cycloalkyl group, or a C6-C20 aryl group.

$R^5$ is preferably a linear or branched C1-C20 alkanediyl group, a C3-C20 cycloalkylene group, or a C6-C20 arylene group.

Preferably, n is 0 or 1 for higher reactivity with the copolymer.

$A^1$ contains at least one selected from the group consisting of a nitrogen atom, a phosphorus atom, and a sulfur atom (hereinafter, also referred to as a specific atom), and is bound to $R^5$ through the specific atom. The specific atom is not bound to an active hydrogen, and may be protected by, for example, a trisubstituted hydrocarbylsilyl group. The term "active hydrogen" herein refers to a hydrogen atom bound to an atom other than a carbon atom, and preferably refers to a hydrogen atom having a bond energy lower than the carbon-hydrogen bond of polymethylene.

In particular, $A^1$ is preferably a group that can be converted to an onium ion by the action of an onium salt-forming agent. The compound (B2) containing such a group ($A^1$) can impart excellent shape-retaining properties to the copolymer to be modified.

Specific examples of $A^1$ include a nitrogen-containing group in which two hydrogen atoms of a primary amino group are substituted by two protecting groups; a nitrogen-containing group in which one hydrogen atom of a secondary amino group is substituted by one protecting group; a tertiary amino group; an imino group; a pyridyl group; a phosphorus-containing group in which two hydrogen atoms of a primary phosphino group are substituted by two protecting groups; a phosphorus-containing group in which one hydrogen atom of a secondary phosphino group is substituted by one protecting group; a tertiary phosphino group; and a sulfur-containing group in which one hydrogen atom of a thiol group is substituted by one protecting group. Among these, groups containing a nitrogen atom are preferred because of their good affinity for silica. The term "protecting group" refers to a functional group that converts $A^1$ to a functional group inert to the polymerization active terminal, such as a trisubstituted hydrocarbylsilyl group.

Specific examples of the compound (B2-1) are described below. Examples of compounds containing both an alkoxysilyl group and a nitrogen-containing group in which two hydrogen atoms of a primary amine are substituted by two protecting groups, a nitrogen-containing group in which one hydrogen atom of a secondary amine is substituted by one protecting group, or a tertiary amino group include N,N-bis(trimethylsilyl)aminopropyltrimethoxysilane, N,N-bis(trimethylsilyl)aminopropyl-methyldiethoxysilane, N,N',N'-tris(trimethylsilyl)-N-(2-aminoethyl)-3-aminopropyltriethoxysilane, and 3-(4-trimethylsilyl-1-piperazino)propylmethyldimethoxysilane.

Examples of compounds containing both an alkoxysilyl group and an imino group or a pyridyl group include N-(1,3-dimethylbutylidene)-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, N-(cyclohexylidene)-3-(triethoxysilyl)-1-propaneamine, and trimethoxysilyl, methyldiethoxysilyl, or ethyldimethoxysilyl compounds corresponding to the foregoing triethoxysilyl compounds, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, 3-hexamethyleneiminopropyltrimethoxysilane, 3-hexamethyleneiminopropylmethyldimethoxysilane, and the foregoing compounds whose alkyl and alkanediyl groups are replaced with C1-C6 alkyl and C1-C6 alkanediyl groups, respectively.

Examples of compounds containing both an alkoxysilyl group and a phosphorus-containing group in which two hydrogen atoms of a primary phosphino group are substituted by two protecting groups, a phosphorus-containing group in which one hydrogen atom of a secondary phosphino group is substituted by one protecting group, a tertiary phosphino group, or a sulfur-containing group in which one hydrogen atom of a thiol group is substituted by one protecting group include P,P-bis(trimethylsilyl)phosphinopropylmethyldimethoxysilane, P,P-bis(trimethylsilyl)phosphinopropyltrimethoxysilane, 3-dimethylphosphinopropyltrimethoxysilane, 3-dimethylphosphinopropylmethyldimethoxysilane, 3-diphenylphosphinopropyltrimethoxysilane, 3-diphenylphosphinopropyltriethoxysilane, 3-diphenylphosphinopropylmethyldimethoxysilane, S-trimethylsilylmercaptopropylmethyldimethoxysilane, S-trimethylsilylmercaptopropyltrimethoxysilane, S-trimethylsilylmercaptopropyltriethoxysilane, S-trimethylsilylmercaptopropylmethyldiethoxysilane, and the foregoing compounds whose alkyl and alkanediyl groups are replaced with C1-C6 alkyl and C1-C6 alkanediyl groups, respectively. In addition, examples of compounds containing an iso(thio)cyanate group include 3-isocyanatopropyltrimethoxysilane and 3-isocyanatopropyltriethoxysilane.

In the compound (B2-2), the group (x2) is preferably a group that contains a nitrogen atom bound to no active hydrogen. Specific examples of such compounds include:

compounds containing a cyclic ether group, such as epoxy amine compounds, e.g., tetraglycidyl-1,3-bisaminomethylcyclohexane, compounds containing a (thio)carbonyl group, such as 4-aminoacetophenones, e.g., 4-N,N-dimethylaminobenzophenone; bis(dihydrocarbylaminoalkyl)ketones, e.g., 1,7-bis(methylethylamino)-4-heptanone; dihydrocarbylaminoalkyl (meth)acrylates, e.g., 2-dimethylaminoethyl acrylate; hydrocarbylimidazolidinones, e.g., 1,3-dimethyl-2-imidazolidinone; N-hydrocarbylpyrrolidones, e.g., 1-phenyl-2-pyrrolidone; N-hydrocarbylcaprolactams, e.g., N-methyl-ε-caprolactam; N-dihydrocarbylformamides, e.g., N,N-diethylformamide; N,N-dihydrocarbylacetamides, e.g., N,N-dimethylacetamide; and (meth)acrylamides, e.g., N,N-dimethylacrylamide, and compounds containing an iso(thio)cyanate group, such as 3-isocyanatopropyltrimethoxysilane.

Examples of the compound (B2-3) include 2,4-tolylene diisocyanate, 2,6-tolylene diisocyanate, diphenylmethane diisocyanate, naphthalene diisocyanate, triphenylmethane triisocyanate, p-phenylene diisocyanate, tris(isocyanatophenyl)thiophosphate, xylene diisocyanate, benzene-1,2,4-triisocyanate, naphthalene-1,2,5,7-tetraisocyanate, and 1,4-phenylene diisothiocyanate.

The compound (B2) is particularly preferably a compound (B2-1) because of its high affinity for silica. When a silane compound (B2-1) is used, for example, silicon tetrachloride or an epoxy-containing compound (e.g., tetraglycidyl-1,3-bisaminomethylcyclohexane) may be used with the silane compound (B2-1) to control the Mooney viscosity of the modified copolymer. All the compounds (B2) mentioned above have the same effect in terms of allowing the resulting modified copolymer to have a modified polymerization terminating terminal. Thus, those which are not disclosed in EXAMPLES later can also be used in the present invention. A structure represented by the formula (1-1) below is introduced to the polymer terminal by the reaction between the compound of formula (1) and the copolymer to be modified.

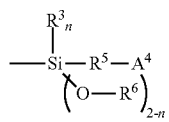

(1-1)

In formula (1-1), $R^6$ represents a hydrogen atom or a hydrocarbyl group, and when a plurality of $R^6$ groups are present, they may be the same or different. Examples of the hydrocarbyl group as $R^6$ include those listed above for the hydrocarbyl group as $R^3$ and $R^4$ in formula (1). $A^4$, $R^3$, $R^5$ and n are as defined for $A^1$, $R^3$, $R^5$ and n, respectively, in formula (1).

The terminal modification reaction may be performed as a solution reaction, for example. The solution reaction may be carried out using the solution containing unreacted monomers obtained after completion of the polymerization reaction in the polymerization step, or a solution prepared by isolating the copolymer from the above solution and dissolving it in an appropriate solvent such as cyclohexane. Moreover, the terminal modification reaction may be carried out either batchwise or continuously. Here, the compound (B2) may be added in any manner, such as at one time, in portions, or continuously.

The amount of the compound (B2) used in the terminal modification reaction may be selected appropriately according to the type of compound used in the reaction. The amount of the compound (B2) is preferably 0.1 mole equivalents or more, more preferably 0.3 mole equivalents or more relative to the metal atom of the polymerization initiator involved in the polymerization reaction. With 0.1 mole equivalents or more, the modification reaction can proceed sufficiently, and the dispersibility of silica can be suitably improved.

The temperature of the terminal modification reaction is usually the same as the temperature of the polymerization reaction, and is preferably −20 to 150° C., more preferably 0 to 120° C., particularly preferably 20 to 100° C. If the modification reaction temperature is low, the viscosity of the modified copolymer tends to increase, while if the modification reaction temperature is high, the polymerization active terminal can be easily deactivated. The duration of the modification reaction is preferably one minute to five hours, more preferably two minutes to one hour.

(Termination of Reaction)

The anionic polymerization may be terminated by addition of a reaction terminator usually used in this field. Examples of such reaction terminators include polar solvents containing active protons such as acetic acid and alcohols (e.g., methanol, ethanol, isopropanol), and mixtures of the foregoing. Other examples include mixtures of the foregoing polar solvents and non-polar solvents such as hexane or cyclohexane. It is usually sufficient that the amount of the reaction terminator to be added be about equal to or twice the molar amount of the initiator for anionic polymerization.

<Coupling>

In the method for producing the copolymer, a coupling agent may be added to the hydrocarbon solution of the copolymer at any time from the initiation of the polymerization of monomers until the polymer is recovered as described later. The coupling agent may be a compound represented by the following formula (2-1):

$$R^1_a ML_{4-a} \quad (2-1)$$

wherein $R^1$ represents an alkyl group, an alkenyl group, a cycloalkenyl group, or an aryl group; M represents a silicon atom or a tin atom; L represents a halogen atom or a hydrocarbyloxy group; and a represents an integer of 0 to 2.

Examples of the coupling agent of formula (2-1) include silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

To enhance the processability of the polymer, the amount of the coupling agent to be added is preferably 0.03 mol or more, more preferably 0.05 mol or more, per mol of the alkali metal derived from an alkali metal catalyst. To enhance fuel economy, the amount is also preferably 0.4 mol or less, more preferably 0.3 mol or less.

<Hydrogenation Method>

In the production of a hydrogenated copolymer, the above-described copolymer may be hydrogenated to obtain a hydrogenated copolymer having a degree of hydrogenation of 30 to 100 mol %. The hydrogenation of the copolymer advantageously improves heat resistance. If the degree of hydrogenation is low, the effects of improving rubber tensile strength at break and abrasion resistance cannot be sufficiently achieved.

The hydrogenation may be carried out by any method under any reaction conditions, including known methods and known conditions. Usually, the hydrogenation is carried out at 20 to 150° C. under 0.1 to 10 MPa hydrogen pressure in the presence of a hydrogenation catalyst. The degree of hydrogenation may be set as desired by changing, for example, the amount of the hydrogenation catalyst, the hydrogen pressure during the hydrogenation reaction, or the duration of the reaction. The hydrogenation catalyst used may usually be a compound containing any of the metals of groups 4 to 11 of the periodic table. For example, compounds containing any of the atoms: Ti, V, Co, Ni, Zr, Ru, Rh, Pd, Hf, Re, and Pt can be used as hydrogenation catalysts. More specific examples of the hydrogenation catalysts include metallocene compounds containing Ti, Zr, Hf, Co, Ni, Pd, Pt, Ru, Rh, Re, or other metals; supported heterogeneous catalysts in which a metal such as Pd, Ni, Pt, Rh, or Ru is supported on a carrier such as carbon, silica, alumina, or diatomaceous earth; homogeneous Ziegler catalysts in which an organic salt or acetylacetone salt of a metal element such as Ni or Co is combined with a reducing agent such as an organoaluminum; organometallic compounds or complexes containing Ru, Rh, or other metals; and fullerenes and carbon nanotubes in which hydrogen is stored.

Among these, metallocene compounds containing Ti, Zr, Hf, Co, or Ni are preferred because they allow the hydrogenation reaction to be carried out in a homogeneous system in an inert organic solvent. More preferred are metallocene compounds containing Ti, Zr, or Hf. In particular, hydrogenation catalysts obtained by reaction of titanocene compounds and alkyllithiums are preferred because such catalysts are inexpensive and industrially very useful. Specific examples include hydrogenation catalysts described in, for example, JP H1-275605 A, JP H5-271326 A, JP H5-271325 A, JP H5-222115 A, JP H11-292924 A, JP 2000-37632 A, JP S59-133203 A, JP S63-5401 A, JP S62-218403 A, JP H7-90017 A, JP S43-19960 B, and JP S47-40473 B. These hydrogenation catalysts may be used alone or in combinations of two or more.

It is sufficient that the amount of the hydrogenated copolymer based on 100% by mass of the rubber component be 80% by mass or less. From the standpoints of abrasion resistance and of reducing changes in hardness, the amount is preferably 20% by mass or more, more preferably 40% by mass or more, still more preferably 50% by mass or more. From the standpoint of durability, the amount is preferably 60% by mass or less.

Examples of materials other than the hydrogenated copolymer that may be used in the rubber component include natural rubber (NR), polyisoprene rubber (IR), styrene-butadiene rubber (SBR), and polybutadiene rubber (BR). One of these may be used alone, or two or more of these may be used in combination. To well achieve the advantageous effects of the present invention, SBR is preferred among these.

Any SBR may be used, and examples include emulsion-polymerized styrene-butadiene rubber (E-SBR) and solution-polymerized styrene-butadiene rubber (S-SBR).

The SBR may be a modified SBR. Any modified SBR having a functional group interactive with a filler such as carbon black may be used. For example, it may be a chain end-modified rubber obtained by modifying at least one chain end of a polymer with a compound (modifier) having the functional group (i.e., a chain end-modified rubber terminated with the functional group); a backbone-modified rubber having the functional group in the backbone; a backbone- and chain end-modified rubber having the functional group in both the backbone and chain end (for example, a backbone- and chain end-modified BR in which the backbone has the functional group and at least one chain end is modified with the modifier); or a chain end-modified rubber that has been modified (coupled) with a polyfunctional compound having two or more epoxy groups in the molecule so that a hydroxyl or epoxy group is introduced. These may be used alone or in combinations of two or more.

Examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxyl, oxy, and epoxy groups. These functional groups may be substituted. To more suitably achieve the advantageous effects of the present invention, amino (preferably amino whose hydrogen atom is replaced with a C1-C6 alkyl group), alkoxy (preferably C1-C6 alkoxy), and alkoxysilyl (preferably C1-C6 alkoxysilyl) groups are preferred among these.

The SBR may be a commercial product of, for example, JSR Corporation, Asahi Kasei Corporation, or Zeon Corporation.

The amount of the SBR, if present, based on 100% by mass of the rubber component is preferably 20% by mass or more, more preferably 40% by mass or more, but is preferably 80% by mass or less, more preferably 60% by mass or less, still more preferably 50% by mass or less. When the amount is within the range indicated above, the advantageous effects of the present invention can be well achieved.

The rubber composition contains a liquid polymer as a softener. The liquid polymer is a polymer that is liquid at room temperature (25° C.) and may have a number average molecular weight (Mn) of 2,500 to 500,000. From the standpoint of reducing changes in hardness, the Mn is preferably 8,000 or more, more preferably 9,000 or more. From the standpoint of ensuring an appropriate hardness, the Mn is preferably 300,000 or less, more preferably 150,000 or less.

Examples of the liquid polymer include (co)polymers of at least one selected from the group consisting of butadiene, isoprene, styrene, farnesene, and derivatives thereof. These may be used alone or in combinations of two or more. Preferred among these are polymers of butadiene (polybutadienes), copolymers of styrene and butadiene, and copolymers of farnesene and butadiene.

The liquid polymer may also be a modified liquid polymer prepared by modification with maleic acid, fumaric acid, or other modifiers. The modified liquid polymer is preferably a liquid polymer modified with maleic acid, more preferably a polybutadiene modified with maleic acid.

The liquid polymer may be a commercial product of, for example, CRAY VALLEY or Kuraray Co., Ltd.

It is sufficient that the amount of the liquid polymer per 100 parts by mass of the rubber component be 1 to 50 parts by mass. From the standpoints of reducing changes in hardness and of ensuring an appropriate hardness, the amount is preferably 10 parts by mass or more, more preferably 20 parts by mass or more. From the standpoints of abrasion resistance and of ensuring an appropriate hardness, the amount is preferably 40 parts by mass or less, more preferably 30 parts by mass or less.

The rubber composition preferably contains silica. Any silica may be used, and examples include dry silica (anhydrous silica) and wet silica (hydrous silica). Wet silica is preferred because it contains a large number of silanol groups.

The silica preferably has a nitrogen adsorption specific surface area ($N_2SA$) of 100 $m^2/g$ or more, more preferably 150 $m^2/g$ or more, still more preferably 180 $m^2/g$ or more, but preferably 300 $m^2/g$ or less, more preferably 250 $m^2/g$ or less. When the $N_2SA$ is within the range indicated above, the advantageous effects of the present invention can be well achieved.

The nitrogen adsorption specific surface area of the silica is measured by the BET method in accordance with ASTM D3037-81.

The amount of the silica, if present, per 100 parts by mass of the rubber component is preferably 5 parts by mass or more, more preferably 50 parts by mass or more, still more preferably 85 parts by mass or more, but is preferably 200 parts by mass or less, more preferably 120 parts by mass or less, still more preferably 100 parts by mass or less. When the amount is within the range indicated above, the advantageous effects of the present invention can be well achieved.

The rubber composition preferably contains an additional filler in addition to the silica. Herein, fillers are intended to be incorporated into the rubber composition to reinforce the rubber, and examples include white fillers such as calcium carbonate, mica (e.g., sericite), aluminum hydroxide, magnesium oxide, magnesium hydroxide, clay, talc, alumina, titanium oxide, and mica; and carbon black. These fillers may be used in combinations of two or more. For reinforcement purposes, it is particularly preferred to incorporate carbon black.

When a filler other than the silica is present, the amount of the silica based on 100% by mass of the total fillers is preferably 80% by mass or more, more preferably 90% by mass or more, but is preferably 99% by mass or less, more preferably 95% by mass or less. When the amount is within the range indicated above, the advantageous effects of the present invention can be well achieved.

Examples of the carbon black include furnace black (furnace carbon black) such as SAF, ISAF, HAF, MAF, FEF, SRF, GPF, APF, FF, CF, SCF, and ECF; acetylene black (acetylene carbon black); thermal black (thermal carbon black) such as FT and MT; channel black (channel carbon black) such as EPC, MPC, and CC; and graphite. These types of carbon black may be used alone or in combinations of two or more.

The carbon black preferably has a nitrogen adsorption specific surface area ($N_2SA$) of 5 $m^2/g$ or more, more preferably 50 $m^2/g$ or more, still more preferably 96 $m^2/g$ or more, but preferably 200 $m^2/g$ or less, more preferably 150 $m^2/g$ or less, still more preferably 120 $m^2/g$ or less. The carbon black also preferably has a dibutyl phthalate absorption (DBP) of 5 mL/100 g or more, more preferably 80 mL/100 g or more, still more preferably 124 mL/100 g or more, but preferably 200 mL/100 g or less, more preferably 160 mL/100 g or less, still more preferably 140 mL/100 g or less. When the $N_2SA$ and DBP are within the respective ranges indicated above, the advantageous effects of the present invention can be well achieved.

The nitrogen adsorption specific surface area of the carbon black is measured in accordance with ASTM D4820-93. The DBP absorption of the carbon black is measured in accordance with ASTM D2414-93.

In the case of the rubber composition containing carbon black, the amount of the carbon black per 100 parts by mass of the rubber component is preferably 1 part by mass or more, more preferably 5 parts by mass or more, but is preferably 30 parts by mass or less, more preferably 10 parts by mass or less. When the amount is within the range indicated above, the advantageous effects of the present invention can be well achieved.

The rubber composition preferably contains a silane coupling agent together with the silica.

The silane coupling agent may be a conventionally known one. Examples include: sulfide silane coupling agents such as bis(3-triethoxysilylpropyl)tetrasulfide, bis(2-triethoxysilylethyl)tetrasulfide, bis(3-trimethoxysilylpropyl)tetrasulfide, bis(2-trimethoxysilylethyl)tetrasulfide, bis(3-triethoxysilylpropyl)trisulfide, bis(3-trimethoxysilylpropyl)trisulfide, bis(3-triethoxysilylpropyl)disulfide, bis(3-trimethoxysilylpropyl)disulfide, 3-trimethoxysilylpropyl-N,N-dimethylthiocarbamoyltetrasulfide, 3-trimethoxysilylpropylbenzothiazolyltetrasulfide, 3-triethoxysilylpropylbenzothiazoletetrasulfide, 3-triethoxysilylpropyl methacrylate monosulfide, and 3-trimethoxysilylpropyl methacrylate monosulfide; mercapto silane coupling agents such as 3-mercaptopropyltrimethoxysilane, 3-mercaptopropyltriethoxysilane, 2-mercaptoethyltrimethoxysilane, and 2-mercaptoethyltriethoxysilane; vinyl silane coupling agents such as vinyltriethoxysilane and vinyltrimethoxysilane; amino silane coupling agents such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane; glycidoxy silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane; nitro silane coupling agents such as 3-nitropropyltrimethoxysilane and 3-nitropropyltriethoxysilane; and chloro silane coupling agents such as 3-chloropropyltrimethoxysilane, 3-chloropropyltriethoxysilane, 2-chloroethyltrimethoxysilane, and 2-chloroethyltriethoxysilane. These silane coupling agents may be used alone or in combinations of two or more. From the standpoints of the coupling effect of silane coupling agents, processability, and cost, sulfide silane coupling agents are preferred among these, with bis(3-triethoxysilylpropyl)tetrasulfide or bis(3-triethoxysilylpropyl)disulfide being more preferred.

The amount of the silane coupling agent, if present, per 100 parts by mass of the silica is preferably 3 parts by mass or more, more preferably 8 parts by mass or more, still more preferably 10 parts by mass or more, but is preferably 15 parts by mass or less, more preferably 12 parts by mass or less. When the amount is within the range indicated above, the advantageous effects of the present invention can be well achieved.

The rubber composition may contain a resin having a softening point equal to or higher than 60° C. but lower than 150° C. (preferably from 60 to 120° C.).

The resin is a resin that is solid at room temperature (25° C.) (solid resin), and examples include aromatic vinyl polymers, coumarone-indene resins, indene resins, terpene resins, and rosin resins. These may be used alone or in combinations of two or more. Among these, aromatic vinyl polymers, coumarone-indene resins, and terpene resins are preferred, with aromatic vinyl polymers being more preferred.

The aromatic vinyl polymers include resins produced by polymerization of α-methylstyrene and/or styrene, and examples include homopolymers of styrene, homopolymers of α-methylstyrene, and copolymers of α-methylstyrene and styrene. Among these, copolymers of α-methylstyrene and styrene are preferred. The coumarone-indene resins refer to resins which contain coumarone and indene as main monomer components to form the skeleton (backbone) of the resins. Examples of monomer components other than coumarone and indene that may be contained in the skeleton include styrene, α-methylstyrene, methylindene, and vinyltoluene. The indene resins refer to resins which contain indene as a main monomer component to form the skeleton (backbone) of the resins. The terpene resins include resins produced by polymerization of terpene compounds such as α-pinene, β-pinene, camphor, or dipetene; and aromatic modified terpene resins, typically such as resins made from terpene compounds and phenolic compounds as starting materials (terpene-phenol resins) and resins made from terpene compounds and styrenic compounds as starting materials (terpene-styrene resins). The rosin resins refer to rosin-based resins, typically such as natural rosins, polymerized rosins, modified rosins, esterified compounds of these rosins, and hydrogenated products of these rosins.

It is sufficient that the resin have a softening point equal to or higher than 60° C. but lower than 150° C. (preferably from 60 to 120° C.). The softening point is preferably 75° C. or higher, more preferably 90° C. or higher, but is preferably 100° C. or lower. When the softening point is within the range indicated above, the advantageous effects of the present invention can be well achieved.

Herein, the softening point is measured in accordance with JIS K 6220-1:2001 using a ring and ball softening point measuring apparatus and is defined as the temperature at which the ball drops down.

The amount of the resin, if present, per 100 parts by mass of the rubber component is preferably 1 part by mass or more, more preferably 3 parts by mass or more, still more preferably 5 parts by mass or more, particularly preferably 10 parts by mass or more, but is preferably 50 parts by mass or less, more preferably 30 parts by mass or less, still more preferably 20 parts by mass or less. When the amount is within the range indicated above, the advantageous effects of the present invention can be well achieved.

The rubber composition may contain an oil.

Examples of the oil include process oils and plant oils, and mixtures thereof. Examples of the process oils include paraffinic process oils, aromatic process oils, and naphthenic process oils. Examples of the plant oils include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. These may be used alone or in combinations of two or more. To well achieve the advantageous effects of the present invention, process oils are preferred among these, with aromatic process oils being more preferred.

The amount of the oil, if present, per 100 parts by mass of the rubber component is preferably 1 part by mass or more, more preferably 5 parts by mass or more, but is preferably 30 parts by mass or less, more preferably 20 parts by mass or less. With such an amount, the advantageous effects of the present invention can be more suitably achieved.

The rubber composition may contain a wax.

Any wax may be used. Examples include petroleum waxes such as paraffin waxes and microcrystalline waxes; naturally-occurring waxes such as plant waxes and animal waxes; and synthetic waxes such as polymers of ethylene, propylene, or other similar monomers. These may be used alone or in combinations of two or more. Preferred among these are petroleum waxes, with paraffin waxes being more preferred.

The wax may be a commercial product of, for example, Ouchi Shinko Chemical Industrial Co., Ltd., Nippon Seiro Co., Ltd., or Seiko Chemical Co., Ltd.

The amount of the wax, if present, per 100 parts by mass of the rubber component is preferably 0.3 parts by mass or more, more preferably 0.5 parts by mass or more, but is preferably 20 parts by mass or less, more preferably 10 parts by mass or less. With such an amount, the advantageous effects of the present invention can be more suitably achieved.

The rubber composition may contain an antioxidant.

Examples of the antioxidant include: naphthylamine antioxidants such as phenyl-α-naphthylamine; diphenylamine antioxidants such as octylated diphenylamine and 4,4'-bis (α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis[methylene-3-(3',5'-di-t-butyl-4'-hydroxyphenyl)propionate]methane. These may be used alone or in combinations of two or more. Among these, p-phenylenediamine or quinolone antioxidants are preferred.

The antioxidant may be a commercial product of, for example, Seiko Chemical Co., Ltd., Sumitomo Chemical Co., Ltd., Ouchi Shinko Chemical Industrial Co., Ltd., or Flexsys.

The amount of the antioxidant, if present, per 100 parts by mass of the rubber component is preferably 0.5 parts by mass or more, more preferably 1 part by mass or more, but is preferably 10 parts by mass or less, more preferably 5 parts by mass or less. With such an amount, the advantageous effects of the present invention can be more suitably achieved.

The rubber composition may contain stearic acid.

The stearic acid may be a conventional one, and examples include products of NOF Corporation, Kao Corporation, FUJIFILM Wako Pure Chemical Corporation, and Chiba Fatty Acid Co., Ltd.

The amount of the stearic acid, if present, per 100 parts by mass of the rubber component is preferably 0.5 parts by mass or more, more preferably 1 part by mass or more, but is preferably 10 parts by mass or less, more preferably 5 parts by mass or less. With such an amount, the advantageous effects of the present invention can be more suitably achieved.

The rubber composition may contain zinc oxide.

The zinc oxide may be a conventional one, and examples include products of Mitsui Mining & Smelting Co., Ltd., Toho Zinc Co., Ltd., HakusuiTech Co., Ltd., Seido Chemical Industry Co., Ltd., and Sakai Chemical Industry Co., Ltd.

The amount of the zinc oxide, if present, per 100 parts by mass of the rubber component is preferably 0.5 parts by mass or more, more preferably 1 part by mass or more, but is preferably 10 parts by mass or less, more preferably 5 parts by mass or less. With such an amount, the advantageous effects of the present invention can be more suitably achieved.

The rubber composition may contain sulfur.

Examples of the sulfur include those generally used in the rubber industry, such as powdered sulfur, precipitated sulfur, colloidal sulfur, insoluble sulfur, highly dispersible sulfur, and soluble sulfur. These may be used alone or in combinations of two or more.

The sulfur may be a commercial product of, for example, Tsurumi Chemical Industry Co., Ltd., Karuizawa Sulfur Co., Ltd., Shikoku Chemicals Corporation, Flexsys, Nippon Kanryu Industry Co., Ltd., or Hosoi Chemical Industry Co., Ltd.

The amount of the sulfur, if present, per 100 parts by mass of the rubber component is preferably 0.1 parts by mass or more, more preferably 0.5 parts by mass or more, but is preferably 10 parts by mass or less, more preferably 5 parts by mass or less, still more preferably 3 parts by mass or less. With such an amount, the advantageous effects of the present invention can be more suitably achieved.

The rubber composition may contain a vulcanization accelerator.

Examples of the vulcanization accelerator include: thiazole vulcanization accelerators such as 2-mercaptobenzothiazole, di-2-benzothiazolyl disulfide, and N-cyclohexyl-2-benzothiazyl sulfenamide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazole sulfenamide, N-t-butyl-2-benzothiazolyl sulfenamide, N-oxyethylene-2-benzothiazole sulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. These may be used alone or in combinations of two or more. To more suitably achieve the advantageous effects of the present invention, sulfenamide and guanidine vulcanization accelerators are preferred among these.

The amount of the vulcanization accelerator, if present, per 100 parts by mass of the rubber component is preferably 1 part by mass or more, more preferably 2 parts by mass or more, but is preferably 10 parts by mass or less, more preferably 7 parts by mass or less. With such an amount, the advantageous effects of the present invention can be more suitably achieved.

In addition to the above-mentioned components, the rubber composition may contain additives generally used in the tire industry, such as organic peroxides, and fillers such as calcium carbonate, talc, alumina, clay, aluminum hydroxide, and mica. The amount of such additives is preferably 0.1 to 200 parts by mass per 100 parts by mass of the rubber component.

The rubber composition may be prepared, for example, by kneading the components using a rubber kneading machine such as an open roll mill or a Banbury mixer, and then vulcanizing the kneaded mixture.

The rubber composition may be used in various tire components. In particular, it is suitable for use in, for example, treads, base treads, sidewalls, carcasses, or clinches, more suitably in treads (cap treads).

(Pneumatic Tire)

The pneumatic tire of the present invention may be produced from the rubber composition by usual methods.

Specifically, the unvulcanized rubber composition containing the above-mentioned components may be extruded into the shape of a tire component such as a tread and then assembled with other tire components in a tire building machine in a usual manner to form an unvulcanized tire, which may then be heated and pressurized in a vulcanizer to produce a tire.

The pneumatic tire of the present invention is suitable for use as, for example, a tire for passenger vehicles, trucks and buses, or two-wheeled vehicles, or as a racing tire, particularly as a tire for passenger vehicles.

EXAMPLES

The present invention is specifically described with reference to, but not limited to, examples.

The chemicals used in the synthesis and polymerization processes are listed below. The chemicals were purified as needed by conventional techniques.

n-Hexane: a product available from Kanto Chemical Co., Inc.

Styrene: a product available from Kanto Chemical Co., Inc.

Butadiene: 1,3-butadiene available from Tokyo Chemical Industry Co., Ltd.

THF: tetrahydrofuran available from Kanto Chemical Co., Inc.

n-Butyllithium solution: 1.6 M solution of n-butyllithium in hexane available from Kanto Chemical Co., Inc.

Ethanol: a product available from Kanto Chemical Co., Inc.

2,6-Di-tert-butyl-p-cresol: Nocrac 200 available from Ouchi Shinko Chemical Industrial Co., Ltd.

Amine modifier: N,N-bis(trimethylsilyl)aminopropylmethyldiethoxysilane

The methods for evaluating the prepared copolymers are collectively described below.

(Measurement of Degree of Hydrogenation of Conjugated Diene Portion of Polymer)

A solution having a concentration of 15% by mass was prepared using carbon tetrachloride as a solvent. The degree of hydrogenation was calculated from the rate of decrease in the unsaturated bond signals in the $H^1$-NMR spectrum measured at 100 MHz.

(Structural Identification of Polymer)

The structural identification (styrene content, vinyl content, and butadiene content (conjugated diene unit content)) of the polymers was performed using a JNM-ECA series apparatus available from JEOL Ltd. In the analysis, 0.1 g of each unhydrogenated polymer was dissolved in 15 mL of toluene, and the solution was slowly poured into 30 mL of methanol for reprecipitation. The precipitate was dried under reduced pressure and then analyzed.

(Measurement of Weight Average Molecular Weight (Mw) and Number Average Molecular Weight (Mn))

The weight average molecular weight (Mw) and number average molecular weight (Mn) of the polymers were determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards. For the polymers having a modifying group, the Mw and Mn were measured before the modification. This is because the Mw and Mn of the copolymers having a modifying group cannot be accurately determined due to the interaction between the modifying group and the silica gel in the column.

(Measurement of Glass Transition Temperature (Tg))

The glass transition temperature (Tg) was defined as the glass transition onset temperature measured using a differential scanning calorimeter (Q200 available from TA Instruments, Japan) at a temperature increase rate of 10° C./min in accordance with JIS K 7121.

Polymer Production Examples

Synthesis Example 1 (Synthesis of SBR)

A sufficiently nitrogen-purged heat-resistant reaction vessel was charged with 2000 mL of n-hexane, 60 g of styrene, 140 g of butadiene, 2.5 g of THF, and 0.45 mmol of n-butyllithium, followed by stirring at 50° C. for five hours to cause a polymerization reaction. Thereafter, the reaction was terminated by addition of ethanol, and 1 g of 2,6-di-tert-butyl-p-cresol was added to the reaction solution, followed by purification by reprecipitation to give a polymer (SBR).

Synthesis Example 2 (Synthesis of Hydrogenated Copolymer (1))

A sufficiently nitrogen-purged heat-resistant reaction vessel was charged with 2000 mL of n-hexane, 60 g of styrene, 140 g of 1,3-butadiene, 2.5 g of THF, and 0.45 mmol of n-butyllithium, followed by stirring at 50° C. for five hours to cause a polymerization reaction. Thereafter, 0.15 mol of the amine modifier was added, and the mixture was stirred at 0° C. for one hour. Next, the reaction solution was stirred for 20 minutes while supplying hydrogen gas at a pressure of 0.4 MPa gauge to react the unreacted polymer terminal lithium with hydrogen into lithium hydride. Hydrogenation was performed using a titanocene dichloride-based catalyst at a hydrogen gas supply pressure of 0.7 MPa gauge and a reaction temperature of 90° C. Once the cumulative amount of absorbed hydrogen reached the amount corresponding to the target degree of hydrogenation, the reaction temperature was brought to room temperature, and the hydrogen pressure was returned to an ordinary pressure. Then, the reaction solution was drawn from the reaction vessel and introduced into water with stirring. The solvent was removed by steam stripping to give a hydrogenated copolymer (1) (hydrogenated SBR).

Synthesis Example 3 (Synthesis of Hydrogenated Copolymer (2))

A hydrogenated copolymer (2) (hydrogenated SBR) was produced as in Synthesis Example 2, except that no modification reaction was performed, and the cumulative amount of absorbed hydrogen was adjusted so as to correspond to the target degree of hydrogenation.

Synthesis Example 4 (Synthesis of Hydrogenated Copolymer (3))

A hydrogenated copolymer (3) (hydrogenated SBR) was produced as in Synthesis Example 3, except that the amounts of the chemicals and the cumulative amount of absorbed hydrogen were changed.

TABLE 1

|  | SBR | Hydrogenated copolymer | | |
|---|---|---|---|---|
|  |  | (1) | (2) | (3) |
| Degree of hydrogenation (mol %) | 0 | 96 | 80 | 85 |
| Styrene content (% by mass) | 30 | 30 | 30 | 25 |
| Vinyl content (% by mass) | 50 | 49 | 50 | 25 |
| Butadiene content (% by mass) | 70 | 70 | 70 | 75 |
| Weight average molecular weight (Mw) | 490,000 | 510,000 | 520,000 | 450,000 |
| Mw/Mn | 1.23 | 1.22 | 1.24 | 1.24 |
| Glass transition temperature (Tg) (° C.) | −30 | −30 | −30 | −35 |

The chemicals used in examples and comparative examples are described below.

SBR: synthesized as described above

Hydrogenated copolymers (1), (2), and (3): synthesized as described above

Carbon black: Diablack N339 ($N_2SA$: 96 m$^2$/g, DBP absorption: 124 mL/100 g) available from Mitsubishi Chemical Corporation Silica: ULTRASIL VN3 ($N_2SA$: 180 m$^2$/g) available from Evonik Silane coupling agent: Si69 (bis(3-triethoxysilylpropyl) tetrasulfide) available from Evonik Oil: X-140 available from JX Nippon Oil & Energy Corporation Liquid polymer (1): RICON184MA6 (polybutadiene modified with maleic acid, Mn: 9100) available from CRAY VALLEY Liquid polymer (2): FBR-746 (a copolymer of farnesene and butadiene, Mn: 100,000) available from Kuraray Co., Ltd.

Liquid polymer (3): RICON184 (a copolymer of styrene and butadiene, Mn: 8600) available from CRAY VALLEY Liquid polymer (4): RICON130 (polybutadiene, Mn: 2500) available from CRAY VALLEY Resin (1): NOVARES C90 (coumarone-indene resin, softening point: 90° C.) available from Rutgers Chemicals Resin (2): SYLVARES SA85 (α-methylstyrene resin (a copolymer of α-methylstyrene and styrene), softening point: 85° C.) available from Arizona Chemical Resin (3): YS resin T0125 (aromatic modified terpene resin (a copolymer of a terpene compound and styrene), softening point: 125° C.) available from Yasuhara Chemical Co., Ltd.

Antioxidant: Antigene 3C available from Sumitomo Chemical Co., Ltd.

Stearic acid: stearic acid beads TSUBAKI available from NOF Corporation

Zinc oxide: zinc oxide #1 available from Mitsui Mining & Smelting Co., Ltd.

Wax: Sunnoc N available from Ouchi Shinko Chemical Industrial Co., Ltd.

Sulfur: powdered sulfur available from Tsurumi Chemical Industry Co., Ltd.

Vulcanization accelerator (1): Soxinol CZ (N-cyclohexyl-2-benzothiazolyl sulfenamide) available from Sumitomo Chemical Co., Ltd.

Vulcanization accelerator (2): Soxinol D (1,3-diphenylguanidine) available from Sumitomo Chemical Co., Ltd.

Examples and Comparative Examples

According to the formulation shown in Table 2, the materials other than the sulfur and vulcanization accelerators were kneaded for five minutes at 150° C. using a 1.7 L Banbury mixer (Kobe Steel, Ltd.) to give a kneaded mixture. Next, the sulfur and vulcanization accelerators were added to the kneaded mixture, followed by kneading for five minutes at 80° C. using an open roll mill to obtain an unvulcanized rubber composition. The unvulcanized rubber composition was press-vulcanized for 20 minutes at 170° C. in a 0.5 mm-thick die to obtain a vulcanized rubber composition.

<Evaluation Items and Testing Methods>

The vulcanized and unvulcanized rubber compositions prepared as above were evaluated for the following items. Table 2 shows the results.

(Abrasion Resistance)

The volume loss of the vulcanized rubber composition of each formulation example was measured with a laboratory abration and skid tester (LAT tester) at a load of 50 N, a speed of 20 km/h, and a slip angle of 5 degrees. The volume losses are expressed as an index using the equation below, with Comparative Example 1 taken as 100. A higher index indicates better abrasion resistance.

(Abrasion resistance index)=(Volume loss of Comparative Example 1)/(Volume loss of each formulation example)×100

(Hardness Change)

The vulcanized rubber composition of each formulation example was measured for hardness within three days after vulcanization. After being subjected to heat aging (left in an oven at 80° C. for one week), the vulcanized rubber composition was again measured for hardness. Then, the change in hardness from before to after the heat aging treatment was calculated and expressed as an index using the equation below, with Comparative Example 1 taken as 100. A higher index indicates less change in hardness (less hardness). An index of 128 or higher is considered good.

(Hardness change index)=(Hardness change of Comparative Example 1)/(Hardness change of each formulation example)×100

The conditions of the heat aging treatment simulated the conditions of commercial tires after half a year to one year (calculated as the elapsed time from the production week).

(Peeling Resistance)

A PET film with a 1-cm square hole was vertically sandwiched between a 2-mm thick sheet of an unvulcanized tire base rubber composition (containing natural rubber and BR) and a 2-mm thick sheet of the unvulcanized rubber composition of each formulation example so that the two sheets were attached together only at the hole in the PET film, and then the stack was vulcanized at 170° C. for 12 minutes. Next, the resulting sample strip was subjected to a peeling test in accordance with JIS K6256 to measure the peeling resistance. The peeling resistances are expressed as an index using the equation below, with Comparative Example 1 taken as 100. A higher index indicates a higher peeling resistance (adhesive force) and better durability. An index of 60 or higher is considered good.

(Peeling resistance index)=(Peeling resistance of each formation example)/(Peeling resistance of Comparative Example 1)×100

TABLE 2

| | | Comparative Example | | Example | | | | | Comparative Example | Example | Comparative Example | Example |
|---|---|---|---|---|---|---|---|---|---|---|---|---|
| | | 1 | 2 | 1 | 2 | 3 | 4 | 5 | 3 | 6 | 4 | 7 |
| Formulation (parts by mass) | SBR | 100 | 100 | 80 | 60 | 40 | 35 | 20 | — | 60 | 60 | 60 |
| | Hydrogenated copolymer (1) | — | — | 20 | 40 | 60 | 65 | 80 | 100 | — | 40 | 40 |
| | Hydrogenated copolymer (2) | — | — | — | — | — | — | — | — | 40 | — | — |
| | Hydrogenated copolymer (3) | — | — | — | — | — | — | — | — | — | — | — |
| | Carbon black | 5 | 5 | 5 | 5 | 5 | 5 | 5 | 5 | 5 | 5 | 5 |
| | Silica | 85 | 85 | 85 | 85 | 85 | 85 | 85 | 85 | 85 | 85 | 85 |
| | Silane coupling agent | 8.5 | 8.5 | 8.5 | 8.5 | 8.5 | 8.5 | 8.5 | 8.5 | 8.5 | 8.5 | 8.5 |
| | Oil | 25 | — | — | — | — | — | — | — | — | 25 | — |
| | Liquid polymer (1) | — | 25 | 25 | 25 | 25 | 25 | 25 | 25 | 25 | — | — |
| | Liquid polymer (2) | — | — | — | — | — | — | — | — | — | — | 25 |
| | Liquid polymer (3) | — | — | — | — | — | — | — | — | — | — | — |
| | Liquid polymer (4) | — | — | — | — | — | — | — | — | — | — | — |
| | Resin (1) | 5 | 5 | 5 | 5 | 5 | 5 | 5 | 5 | 5 | 5 | 5 |
| | Resin (2) | — | — | — | — | — | — | — | — | — | — | — |
| | Resin (3) | — | — | — | — | — | — | — | — | — | — | — |
| | Antioxidant | 2 | 2 | 2 | 2 | 2 | 2 | 2 | 2 | 2 | 2 | 2 |
| | Stearic acid | 2 | 2 | 2 | 2 | 2 | 2 | 2 | 2 | 2 | 2 | 2 |
| | Zinc oxide | 2 | 2 | 2 | 2 | 2 | 2 | 2 | 2 | 2 | 2 | 2 |
| | Wax | 2 | 2 | 2 | 2 | 2 | 2 | 2 | 2 | 2 | 2 | 2 |
| | Sulfur | 1.2 | 1.2 | 1.2 | 1.2 | 1.2 | 1.2 | 1.2 | 1.2 | 1.2 | 1.2 | 1.2 |
| | Vulcanization accelerator (1) | 1.8 | 1.8 | 1.8 | 1.8 | 1.8 | 1.8 | 1.3 | 1.8 | 1.8 | 1.8 | 1.8 |
| | Vulcanization accelerator (2) | 1.2 | 1.2 | 1.2 | 1.2 | 1.2 | 1.2 | 1.2 | 1.2 | 1.2 | 1.2 | 1.2 |
| Evaluation | Abrasion resistance index | 100 | 100 | 110 | 123 | 131 | 132 | 148 | 155 | 115 | 121 | 122 |
| | Hardness change index | 100 | 110 | 129 | 135 | 142 | 144 | 148 | 156 | 132 | 110 | 143 |
| | Peeling resistance index | 100 | 95 | 93 | 85 | 78 | 75 | 65 | 40 | 91 | 87 | 83 |

| | | Example | | | | Comparative Example | Example | | | | | |
|---|---|---|---|---|---|---|---|---|---|---|---|---|
| | | 8 | 9 | 10 | 11 | 5 | 12 | 13 | 14 | 15 | 16 | 17 |
| Formulation (parts by mass) | SBR | 60 | 60 | 60 | 60 | 60 | 60 | 60 | 60 | 60 | 60 | 60 |
| | Hydrogenated copolymer (1) | 40 | 40 | 40 | 40 | 40 | — | — | — | — | — | — |
| | Hydrogenated copolymer (2) | — | — | — | — | — | — | — | — | — | — | — |
| | Hydrogenated copolymer (3) | — | — | — | — | — | 40 | 40 | 40 | 40 | 40 | 40 |
| | Carbon black | 5 | 5 | 5 | 5 | 5 | 5 | 5 | 5 | 5 | 5 | 5 |
| | Silica | 85 | 85 | 85 | 85 | 85 | 85 | 85 | 85 | 85 | 85 | 85 |
| | Silane coupling agent | 8.5 | 8.5 | 8.5 | 8.5 | 8.5 | 8.5 | 8.5 | 8.5 | 8.5 | 8.5 | 8.5 |
| | Oil | — | — | — | — | — | — | — | — | — | — | — |
| | Liquid polymer (1) | — | — | 10 | 50 | 60 | 25 | 20 | 15 | 10 | 10 | 10 |
| | Liquid polymer (2) | — | — | — | — | — | — | — | — | — | — | — |

TABLE 2-continued

|  |  | | | | | | | | | | | |
|---|---|---|---|---|---|---|---|---|---|---|---|---|
|  | Liquid polymer (3) | 25 | — | — | — | — | — | — | — | — | — | — |
|  | Liquid polymer (4) | — | 25 | — | — | — | — | — | — | — | — | — |
|  | Resin (1) | 5 | 5 | 5 | 5 | 5 | 5 | 10 | 15 | 20 | — | — |
|  | Resin (2) | — | — | — | — | — | — | — | — | — | 20 | — |
|  | Resin (3) | — | — | — | — | — | — | — | — | — | — | 20 |
|  | Antioxidant | 2 | 2 | 2 | 2 | 2 | 2 | 2 | 2 | 2 | 2 | 2 |
|  | Stearic acid | 2 | 2 | 2 | 2 | 2 | 2 | 2 | 2 | 2 | 2 | 2 |
|  | Zinc oxide | 2 | 2 | 2 | 2 | 2 | 2 | 2 | 2 | 2 | 2 | 2 |
|  | Wax | 2 | 2 | 2 | 2 | 2 | 2 | 2 | 2 | 2 | 2 | 2 |
|  | Sulfur | 1.2 | 1.2 | 1.2 | 1.2 | 1.2 | 1.2 | 1.2 | 1.2 | 1.2 | 1.2 | 1.2 |
|  | Vulcanization accelerator (1) | 1.8 | 1.8 | 1.8 | 1.8 | 1.8 | 1.8 | 1.8 | 1.8 | 1.8 | 1.8 | 1.8 |
|  | Vulcanization accelerator (2) | 1.2 | 1.2 | 1.2 | 1.2 | 1.2 | 1.2 | 1.2 | 1.2 | 1.2 | 1.2 | 1.2 |
| Evaluation | Abrasion resistance index | 117 | 116 | 119 | 111 | 86 | 110 | 111 | 110 | 109 | 113 | 109 |
|  | Hardness change index | 134 | 129 | 135 | 133 | 127 | 134 | 133 | 133 | 131 | 131 | 129 |
|  | Peeling resistance index | 85 | 83 | 84 | 92 | 94 | 100 | 102 | 106 | 108 | 111 | 110 |

Table 2 shows that the examples containing predetermined amounts of a specific hydrogenated copolymer and a specific liquid polymer had reduced changes in hardness over time, and further exhibited improved abrasion resistance while ensuring good durability.

Moreover, the examples had good overall performance with a value of 70 or higher as calculated by the following equation:

Overall performance=(Abrasion resistance index−100)×0.5+(Hardness change index−128)×2.5+(Peeling resistance index−60)×3.0.

The invention claimed is:

1. A pneumatic tire, formed from a rubber composition, the rubber composition comprising:
   a rubber component comprising a hydrogenated copolymer containing a structural unit derived from an aromatic vinyl compound and a structural unit derived from a conjugated diene compound; and
   a liquid polymer having a number average molecular weight of 2,500 to 150,000,
   the hydrogenated copolymer having a weight average molecular weight of 300,000 to 2,000,000,
   the hydrogenated copolymer being present in an amount of 20 to 60% by mass based on 100% by mass of the rubber component,
   the liquid polymer being present in an amount of 1 to 50 parts by mass per 100 parts by mass of the rubber component.

2. The pneumatic tire according to claim 1, wherein the hydrogenated copolymer has a degree of hydrogenation of 75 mol % or more.

3. The pneumatic tire according to claim 1, wherein the hydrogenated copolymer is a hydrogenated styrene-butadiene copolymer.

4. The pneumatic tire according to claim 3, wherein the hydrogenated copolymer is a hydrogenated modified styrene-butadiene copolymer.

5. The pneumatic tire according to claim 1, wherein the liquid polymer is a modified liquid polymer.

6. The pneumatic tire according to claim 1, wherein the liquid polymer is a (co)polymer of at least one selected from the group consisting of butadiene, isoprene, styrene, farnesene, and derivatives thereof.

7. The pneumatic tire according to claim 1, wherein the rubber composition further comprises a resin having a softening point of 60 to 120° C.

* * * * *